United States Patent
Shepherd et al.

[15] 3,692,134
[45] Sept. 19, 1972

[54] POWER FOLDABLE DELIMBING PLATFORM

[72] Inventors: Leonard Laverne Shepherd; Victor Charles Pierrot, both of Dubuque, Iowa

[73] Assignee: Deere & Company, Maline, Ill.

[22] Filed: April 26, 1971

[21] Appl. No.: 137,154

[52] U.S. Cl. .................... 180/12, 180/44 F, 180/24, 280/36 R, 280/106 R
[51] Int. Cl. ............................................. B62d 61/10
[58] Field of Search ....... 144/2 Z, 3 D; 180/14 A, 11, 180/12, 66 F, 44 F; 280/34, 42, 400, 401, 415; 296/28 K

[56] References Cited

UNITED STATES PATENTS

| | | | |
|---|---|---|---|
| 2,863,518 | 12/1958 | Pellizzetti | 180/45 |
| 3,587,763 | 6/1971 | Kinkead | 180/14 R |
| 3,623,521 | 11/1971 | Shields | 144/2 Z |
| 3,649,041 | 3/1972 | Cervantez | 280/401 |

*Primary Examiner*—Kenneth H. Betts
*Assistant Examiner*—D. M. Mitchell
*Attorney*—H. Vincent Harsha, Harold M. Knoth, William A. Murray, John M. Nolan and Jimmie R. Oaks

[57] ABSTRACT

A self-propelled delimbing machine includes a horizontal T-shaped frame having a length suitable for supporting full-length trees. First and second ground wheel assemblies are respectively supportingly connected to the opposite ends of the head portion of the frame and a third ground wheel assembly is supportingly connected to the leg portion of the frame at a location spaced more than half the length of the leg portion from the head portion. The leg portion of the frame is divided into first and second sections of approximately equal length, the first section extending from the head portion of the frame and the second section being connected in end-to-end relationship to the first section by a vertical hinge joint. The hinge joint is locked to prevent pivoting when the machine is in a delimbing or working mode and is unlocked to permit the second section to be pivoted to a folded position alongside the first section to shorten the delimbing machine for transport. The pivoting of the second section on the hinge joint is accomplished by operation of the third wheel assembly, which includes drivable and steerable wheels. Stabilizer leg means are mounted on the head portion of the frame and are selectively operated to engage the ground and give added stability to the vehicle when the second section of the leg portion of the frame is being folded.

4 Claims, 2 Drawing Figures

PATENTED SEP 19 1972　3,692,134

INVENTORS
LEONARD L. SHEPHERD
VICTOR C. PIERROT, III

POWER FOLDABLE DELIMBING PLATFORM

BACKGROUND OF THE INVENTION

The present invention relates to a self-propelled delimbing vehicle of the type having an elongate horizontal delimbing platform for supporting full-length trees. More particularly, the present invention relates to such a platform which is constructed so as to be easily folded for transport.

Delimbing vehicles of the above-described type are normally in excess of 60 feet long. A vehicle of this length necessarily swings wide when negotiating corners or curves and cannot be easily nor safely driven upon public roads. Further, it is very difficult to drive such a vehicle along logging roads of a common type which are narrow and have trees growing closely adjacent thereto.

In the past, it has been the practice to construct the delimbing platform in first and second sections disconnectibly secured in end-to-end relationship to each other and to disconnect the second section from the first section leaving only the first section intact with the vehicle power unit for transport. The second section was loaded on a truck, or the like, and transported separately to the desired site whereat it was again joined with the remainder of the delimbing vehicle.

Such operation is time consuming and requires an extra vehicle and operator for hauling the disconnected platform section. This results in an increase in the cost of operating the delimbing vehicle.

SUMMARY OF THE INVENTION

According to the present invention, there is provided a self-propelled delimbing vehicle having a horizontal delimbing platform having a section thereof movable to a folded transport position. More specifically, there is provided a platform including first and second sections interconnected by a lockable vertical hinge joint and means for powering the second section about the hinge joint from an extended working position in end-to-end relationship to the first section to a folded transport position alongside the first section. Still a more specific feature of the invention resides in the provision of steerable and drivable ground support means on the second section for pivoting the second section about the hinge joint. Still another feature resides in the provision of such a ground support means that is one of the primary supporting and driving means for the vehicle.

DESCRIPTION OF THE PREFERRED EMBODIMENT

Figure 1:
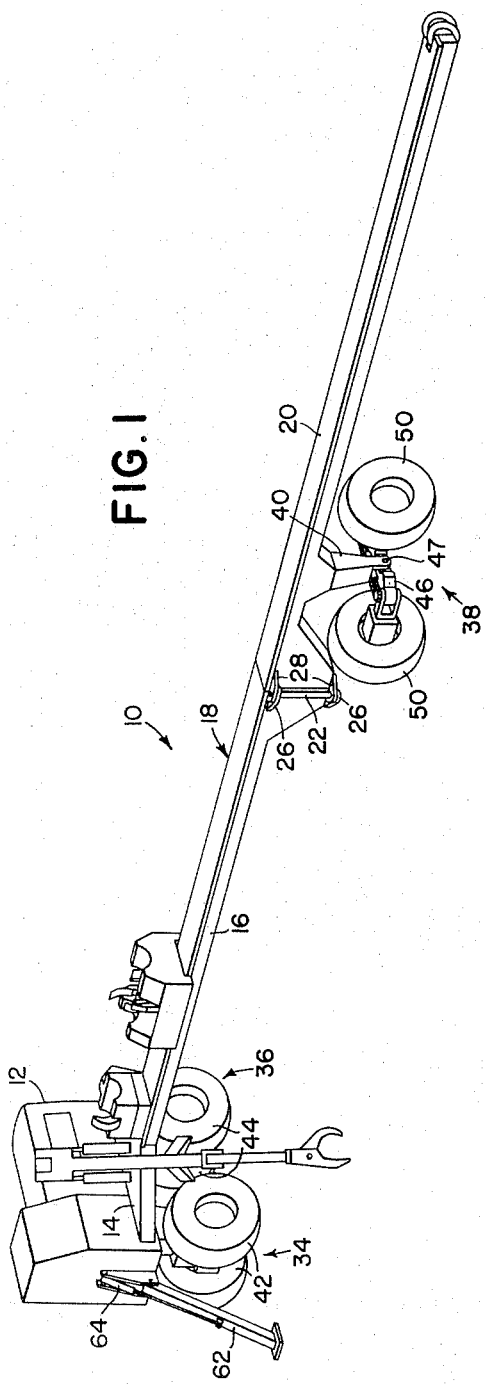
FIG. 1 is an overall perspective view of the delimbing vehicle showing the platform in the working position.

Referring now to the drawings, there is shown a generally T-shaped, self-propelled delimbing vehicle indicated in its entirety by the reference numeral 10. The vehicle 10 includes a power unit 12 forming the head of the vehicle and having a generally horizontal frame 14 to which is fixed one end of a first section 16 of an elongate horizontal delimbing platform 18. The other end of the first platform section 16 is joined to one end of a second section 20 of the platform 18 by means of a double hinge joint 21 (FIG. 2) comprising first and second hinge pins 22 and 24 respectively received in vertically aligned apertures in first and second pairs of ears 26 and 28 respectively fixed at one side of the opposed ends of the platform sections 16 and 20 and third and fourth pairs of ears 30 and 32, only one of each pair shown, respectively fixed to the other side of the opposed ends of the platform sections 16 and 20.

The delimbing vehicle 10 includes first and second drive wheel assemblies 34 and 36 supportingly connected to the frame 14 and a third drive wheel assembly 38 supportingly connected to the bottom of a post 40 depending from the second platform section 20 at a location spaced somewhat from the hinge joint 21. The first and second drive wheel assemblies 34 and 36 respectively include separately drivable pairs of ground wheels 42 and 44 which are steerable between first and second positions for respectively advancing the vehicle parallel and perpendicular to its length. The means for steering and driving the pairs of wheels 42 and 44 is not illustrated but preferably is that which is disclosed in co-pending application Ser. No. 137,193 filed by Victor C. Pierrot III on the same date as and having the same assignee as the instant application. The third wheel assembly 38 includes a rocker arm 46 pivoted at 47 medially of its ends to the post 40 for movement about an axis extending parallel to the length of the delimbing platform section 20. A pair of reversible hydraulic wheel motors 48 are respectively connected centrally to a pair of ground wheels 50 and are respectively horizontally swivelly connected to the opposite ends of the rocker arm 46 through means of a pair of upright pins 52 fixed to the motors 48. Fixed lengthwise on the arm 46 between its opposite ends is a steering cylinder 54 having a piston rod 56 extending from the opposite ends thereof. The opposite ends of the rod 56 are respectively connected to the opposite ends of a length of drive chain 58 which extends about a pair of sprockets 60 respectively connected to the tops of the pins 52. Thus, it can be seen that the wheels 50 may be swiveled or steered in unison about the axes of the pins 52 by actuating the steering cylinder 54 to shift the rod 56 one way or the other.

Figure 2:
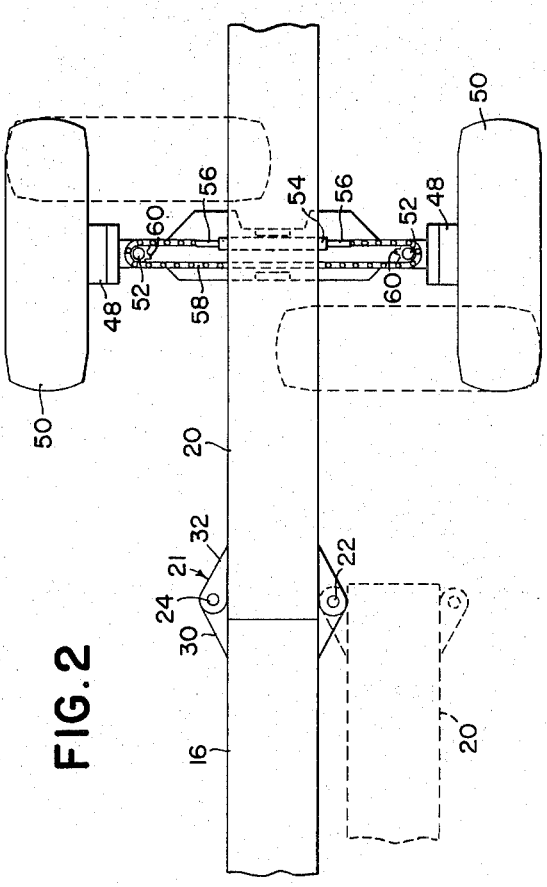
FIG. 2 is a top plan view of the vertical hinge joint, joining the first and second sections of the platform, and the ground support wheels, with solid lines indicating the working position of the platform and a first steered position of the wheels and with dashed lines indicating the folded position of the second section of the platform and a second steered position of the wheels.

In addition to supporting the delimbing platform 18 and being powered to aid in moving the vehicle 10 over the ground, the third wheel assembly 38 also serves to power the second platform section 20 between its extended working position (FIG. 1) and its folded transport position shown in dashed lines in FIG. 2. To ready the vehicle 10 for transport, it is necessary only to remove one or the other of the hinge pins 22 and 24 and appropriately power and steer the wheels 50 to pivot the section 20 about the remaining hinge pin. A pair of stabilizer legs 62, only one shown, are vertically swingably pivoted to the opposite ends of the power unit 12 and are individually swingable into ground contact by a pair of hydraulic cylinders 64, to prevent the power unit 12 and the first platform section 16 from moving while the second section 20 is being folded or unfolded.

We claim:

1. In a mobile delimbing vehicle of the type including an elongate, horizontal frame for supporting tree stems and steerable, driven ground-engaging means supporting said frame, the improvement comprising: said frame including at least first and second separate sections; connecting means joining said sections for permitting said second section to be moved between an extended working position in end-to-end alignment with said first section and a folded transport position alongside said first section; and power means connected at least to said second section for selectively moving the second section between said working and transport positions.

2. The invention defined in claim 1 wherein said driven ground-engaging means includes said power means.

3. A mobile delimbing vehicle comprising: a wheel-supported power unit; a first elongate generally horizontal delimbing platform section connected at one end to said power unit; a second elongate generally horizontal delimbing section; vertical hinge means interconnecting said first and second platform sections for permitting said second section to be swung between an extended working position in longitudinal alignment with said first section and a folded transport position alongside said first section; and steerable and drivable ground-engaging means connected to said second section adjacent said hinge means for powering said second section about said hinge means between said working and transport positions.

4. In a mobile delimbing machine of the type for delimbing full-length trees and including a horizontal platform of substantial length for supporting felled trees, an operator's station located adjacent one end of the platform, first and second driven ground-engaging means respectively mounted at said one end and intermediate the ends of said platform for movement between first and second positions for respectively advancing the machine perpendicular and parallel to its length, and said platform including an adjacent and a remote section, relative to said operator's station, and releasable joint means interconnecting said adjacent and remote sections, the improvement wherein said releasable joint means includes a vertical pivot means permitting said remote section to be moved between an extended working position in longitudinal alignment with the adjacent section and a folded transport position alongside said adjacent section; and said second ground-engaging means being mounted to the remote section and being operable for moving said remote section between said working and transport positions.

* * * * *